(12) United States Patent
O'Sullivan et al.

(10) Patent No.: US 8,705,410 B2
(45) Date of Patent: Apr. 22, 2014

(54) GLOBAL CONFERENCE ROSTER FOR DISTRIBUTED BRIDGES

(75) Inventors: Gerard O'Sullivan, Dublin (IE); Colm Smyth, Dublin (IE)

(73) Assignee: Avaya Inc., Basking Ridge, NJ (US)

( * ) Notice: Subject to any disclaimer, the term of this patent is extended or adjusted under 35 U.S.C. 154(b) by 174 days.

(21) Appl. No.: 12/895,259

(22) Filed: Sep. 30, 2010
(Under 37 CFR 1.47)

(65) Prior Publication Data
US 2012/0082066 A1    Apr. 5, 2012

(51) Int. Cl.
*H04L 12/16*    (2006.01)

(52) U.S. Cl.
USPC ............................................. 370/260

(58) Field of Classification Search
None
See application file for complete search history.

(56) References Cited

U.S. PATENT DOCUMENTS

| | | | |
|---|---|---|---|
| 5,825,858 A | 10/1998 | Shaffer et al. | |
| 6,272,214 B1 * | 8/2001 | Jonsson | 379/202.01 |
| 6,831,899 B1 | 12/2004 | Roy | |
| 7,353,255 B2 * | 4/2008 | Acharya et al. | 709/204 |
| 7,469,299 B2 * | 12/2008 | Johnston | 709/237 |
| 8,060,563 B2 * | 11/2011 | Whynot et al. | 709/204 |
| 2006/0149816 A1 * | 7/2006 | Cadiz et al. | 709/206 |
| 2006/0153102 A1 * | 7/2006 | Kuure et al. | 370/263 |
| 2007/0116225 A1 | 5/2007 | Zhao et al. | |
| 2007/0153997 A1 * | 7/2007 | Shang | 379/114.29 |
| 2007/0217589 A1 * | 9/2007 | Martin et al. | 379/202.01 |
| 2008/0069011 A1 * | 3/2008 | Sekaran et al. | 370/260 |
| 2010/0165889 A1 * | 7/2010 | Madabhushi et al. | 370/261 |
| 2011/0051917 A1 | 3/2011 | Chen et al. | |
| 2012/0036195 A1 * | 2/2012 | Kennedy | 709/206 |

OTHER PUBLICATIONS

A. Johnston, et al., "Session Initiation Protocol (SIP) Call Control—Conferencing for User Agents", RFC 4579, Network Working Group, The Internet Society, Aug. 2006.*
J. Rosenberg, "A Presence Event Package for the Session Initiation Protocol (SIP)", RFC 3856, Network Working Group, The Internet Society, Aug. 2004.*
Barnes et al. "A Framework for Centralized Conferencing." The IETF Trust, Jun. 2008, RFC 5239, 58 pages.
Barnes et al. "XCON-CCMP: Centralized Conferencing Manipulation Protocol." Internet Engineering Task Force, Feb. 2010, draft-ietf-xcon-ccmp-06, 102 pages.
Dolly et al. "Media Server Control Protocol Requirements." The IETF Trust, Mar. 2008, RFC 5167, 10 pages.
Even et al. "Conferencing Scenarios." The Internet Society, Jul. 2006, RFC 4597, 18 pages.

(Continued)

*Primary Examiner* — Dang Ton
*Assistant Examiner* — Ronald h Davis
(74) *Attorney, Agent, or Firm* — Sheridan Ross P.C.

(57) ABSTRACT

When a conference bridge establishes a link line with another conference bridge to provide a global conference, a global conference application executing at the conference bridge establishes a SIP dialout with one or more remote conference bridges. The global conference application uses the XCON standard and/or the CCMP draft standard to subscribe for event notifications for that conference from the remote conference bridge. The received event notifications can be made available for use by the source conference bridge when constructing the roster information for applications executing at the source conference bridge. The received event notifications can be displayed and provide the proper diagram for the distributed conference complete with media, mode, and other information displayed. Further, the system allows the use of intelligent endpoint user interfaces to control mute, lecture mode, sidebars, breaking the bridge into sub-groups, and the like during the conference.

19 Claims, 7 Drawing Sheets

(56) References Cited

OTHER PUBLICATIONS

Melanchuk "An Architectural Framework for Media Server Control." IETF Trust, Jun. 2009, RFC5567, 26 pages.

Rosenberg et al. "A Session Initiation Protocol (SIP) Event Package for Conference State." Internet Engineering Task Force (IETF), Aug. 2006, RFC 4575, 49 pages.

Rosenberg "A Framework for Conferencing with the Session Initiation Protocol (SIP)." The Internet Society, Feb. 2006, RFC 4353, 30 pages.

Rosenberg et al. "SIP: Session Initiation Protocol." The Internet Society, Jun. 2002, RFC 3261, 8 pages.

Search Report for United Kingdom Patent Application No. GB1116754.1, dated Jan. 26, 2012 3 pages.

* cited by examiner

GLOBAL CONFERENCE ROSTER FOR DISTRIBUTED BRIDGES

BACKGROUND

Many organizations have facilities spread around the world. To communicate between the different facilities, organizations generally employ conferencing systems. A method for conferencing between two facilities in different parts of the world is called a global conference. The global conference often involves two conference bridges that organize and conduct the conference. A first conference bridge manages the conference in the first location and the second conference bridge manages the conference in the second location. The two conference bridges then communicate between each other to conduct the conference. This arrangement eliminates the need for all participants to dial into a single conference bridge, which saves long distance charges.

Unfortunately, the global conferences are only managed locally. Thus, to an end user, the conference only appears to be conducted with the members connected to the local conference bridge. There is no sharing of information between the conference bridges during a global conference. Additionally, commands are not propagated between the two conference bridges. For example, if a moderator is present on one of the conference bridges, and the moderator wishes to use an operation or function in the conference (for example, lecture mode, which mutes all phones but one), then the operational change is executed at the local conference bridge but not the distant conference bridge. Still further, the conference bridges cannot provide an accurate graphical depiction of the distributed conference because information about the distant conference bridge is unknown.

Current global conferences also cannot use two or more protocols, e.g., using one communications protocol (such as, instant messaging using Extensible Messaging and Presence Protocol (XMPP)) for a first conference bridge and then adding communication channels which are supported by other protocols (such as, audio or video communication using Session Initiation Protocol (SIP)) at a second conference bridge. Finally, different users on a conference may have different communication capabilities available to them. These different capabilities are often not communicated with other users, especially users at distant conference bridges.

SUMMARY

The embodiments presented herein provide an automated system for establishing a connection between conference bridges to exchange information about a global conference. A conference bridge sends a SIP registration to another conference bridge to receive notifications of state changes to the conference executing on the other conference bridge. Notifications are sent between the conference bridges and update local information with information about the distant conference. The amalgam of information is then provided to users for roster application to display the information.

When a conference bridge establishes a link line with another conference bridge to provide a global conference, the application establishes a dialed-out link line that is a SIP dialout. The application also uses the XCON standard and/or the CCMP draft standard to subscribe for event notifications for that conference from the target conference bridge. The received event notifications can be made available for use by the source conference bridge when constructing the roster information for all connection applications. Further, the application may understand the capabilities of the endpoints, so that for intelligent endpoints that provide graphical metaphor, the subscription to event notifications can display the proper diagram for the distributed conference complete with media, mode, and other information displayed. Further, the system allows the use of intelligent endpoint user interface (UI) action elements to control mute, lecture mode, sidebars, breaking the bridge into sub-groups, and the like during the conference.

In prior system, a conference roster application is achieved by using a bandwidth intensive application programming interface (API) to subscribe to all events that occur on a conference bridge. To implement a global conference roster using this type of API, each conference bridge would need to use this API to connect to every other bridge, and the conference bridges would then receive notifications for all events taking place on the bridge. Connecting to all other conference bridges is resource intensive. Further, the prior systems are not extensible to intelligent endpoints.

The proposed embodiments pass roster information between the conference bridges within the SIP communication that is a part of the link lines between the bridges for global conferences. This solution is extensible to intelligent graphical metaphor endpoints. Further, while it is desirable to use specific communication protocols for their preferred communication modalities (instant messaging (IM) in XMPP or audio and video in SIP, etc.), there is no existing mechanism to allow the conference roster to be synchronized if different modalities are used. The proposed embodiments keep a common set of users across two or more bridges and further can use IM invitations and telephony call-outs to request a user to join a conference on a bridge associated with a different protocol.

The embodiments provide for the use of an application combined with XCON and CCMP standards to deliver SIP conference event packages for roster, graphical bridge depiction on intelligent endpoints, status, and UI action elements within a distributed bridge configuration, while enabling bridges in different protocols to synchronize their rosters.

The term "conference" as used herein refers to any communication or set of communications, whether including audio, video, text, or other multimedia data, between two or more communication endpoints and/or users. Typically, a conference includes three or more communication endpoints.

The term "communication device" or "communication endpoint" as used herein refers to any hardware device and/or software operable to engage in a communication session. For example, a communication device can be an IP-enabled phone, a desktop phone, a cellular phone, a personal digital assistant, a soft-client telephone program executing on a computer system, etc. In embodiments, the communication endpoint is a computer system as described in conjunction with FIGS. 6 and 7.

The term "conference bridge" as used herein refers to any hardware, software, or a combination of hardware and software operable to conduct, manage, execute, or otherwise hold a conference between two or more communication endpoints and/or one or more other conference bridges. The conference bridge may be a server or computer system as described in conjunction with FIGS. 6 and 7.

The term "roster" or "roster application" as used herein refers to any module executed in a conference bridge and/or communication endpoint for providing information about a conference conducted on a conference bridge.

The term "conference engine" as used herein refers to a module executed by a conference bridge to establish and/or conduct a conference.

The term "global conference" as used herein refers to a conference between two or more conference bridges, wherein each conference bridge communicates with at least one communication endpoint. In embodiments, the global conference includes two geographically separated conference bridges that communicate by a link line.

The term "virtual link line" or "link line" as used herein refers to a communication channel or link between two conference bridges formed over at least one network. The link line can be a data connection that allows the conference bridges to exchange audio, video, or other data between the conference bridges. Generally, the link line is established during the setup of a global conference.

The term "lecture mode" as used herein refers to an operation executed by a conference bridge where all communication endpoints in a conference are muted except for one communication endpoint, which allows for lecturing the other communication endpoints.

The term "XCON" as used herein refers to centralized conferencing. XCON is as described in RFC 4597, dated July 2006, by Even et al., available from the Internet Engineering Task Force (IETF); this document and all other documents (e.g., RFC 5167, RFC 5567, RFC 5239, etc.) from the XCON Working Group of the IETF describing XCON are herein incorporated by reference in their entirety for all that they teach. The embodiments may also use XCON-like or other protocols to accomplish the processes described herein.

The term "CCMP" as used herein refers to the conference control and manipulation protocol. CCMP is as described in "XCON-CCMP: Centralized Conferencing Manipulation Protocol", dated February 2010, by Barnes, Boulton, Romano, and Schulzrinne, available from the Internet Engineering Task Force (IETF); this document is herein incorporated by reference in its entirety for all that it teaches. The embodiments may also use CCMP-like or other protocols to accomplish the processes described herein.

The term "HTTP" as used herein refers to a Hypertext Transfer Protocol as known to one skilled in the art.

The term "SIP" as used herein refers to Session Initiation Protocol. SIP is as described in RFC 4575, dated August 2006, by Rosenberg et al., available from the Internet Engineering Task Force (IETF); this document and all other documents (e.g., RFC 4353, RFC 3261, etc.) from the IETF describing SIP are herein incorporated by reference in their entirety for all that they teach. The embodiments may also use SIP-like or other protocols to accomplish the processes described herein.

The term "network" as used herein refers to a system used by one or more users to communicate. The network can consist of one or more session managers, feature servers, communication endpoints, etc. that allow communications, whether voice or data, between two users. A network can be any network or communication system as described in conjunction with FIGS. 6 and 7. Generally, a network can be a local area network (LAN), a wide area network (WAN), a wireless LAN, a wireless WAN, the Internet, etc. that receives and transmits messages or data between devices. A network may communicate in any format or protocol known in the art, such as, transmission control protocol/internet protocol (TCP/IP), 802.11g, 802.11n, Bluetooth, or other formats or protocols.

The term "database" or "data model" as used herein refers to any system, hardware, software, memory, storage device, firmware, component, etc., that stores data. The data model can be any type of database or storage framework described in conjunction with FIGS. 6 and 7, which is stored on any type of non-transitory, tangible computer readable medium. The data model can include one or more data structures, which may comprise one or more sections that store an item of data. A section may include, depending on the type of data structure, an attribute of an object, a data field, or other types of sections included in one or more types of data structures. The data model can represent any type of database, for example, relational databases, flat file databases, object-oriented databases, or other types of databases. Further, the data structures can be stored in memory or memory structures that may be used in either run-time applications or in initializing a communication.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, embodiments are considered to include a tangible, non-transitory storage medium and prior art-recognized equivalents and successor media, in which the software implementations of the embodiments are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the embodiments are described in terms of exemplary embodiments, individual aspects of the embodiments can be separately claimed.

BRIEF DESCRIPTION OF THE DRAWINGS

The present disclosure is described in conjunction with the appended Figs..

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
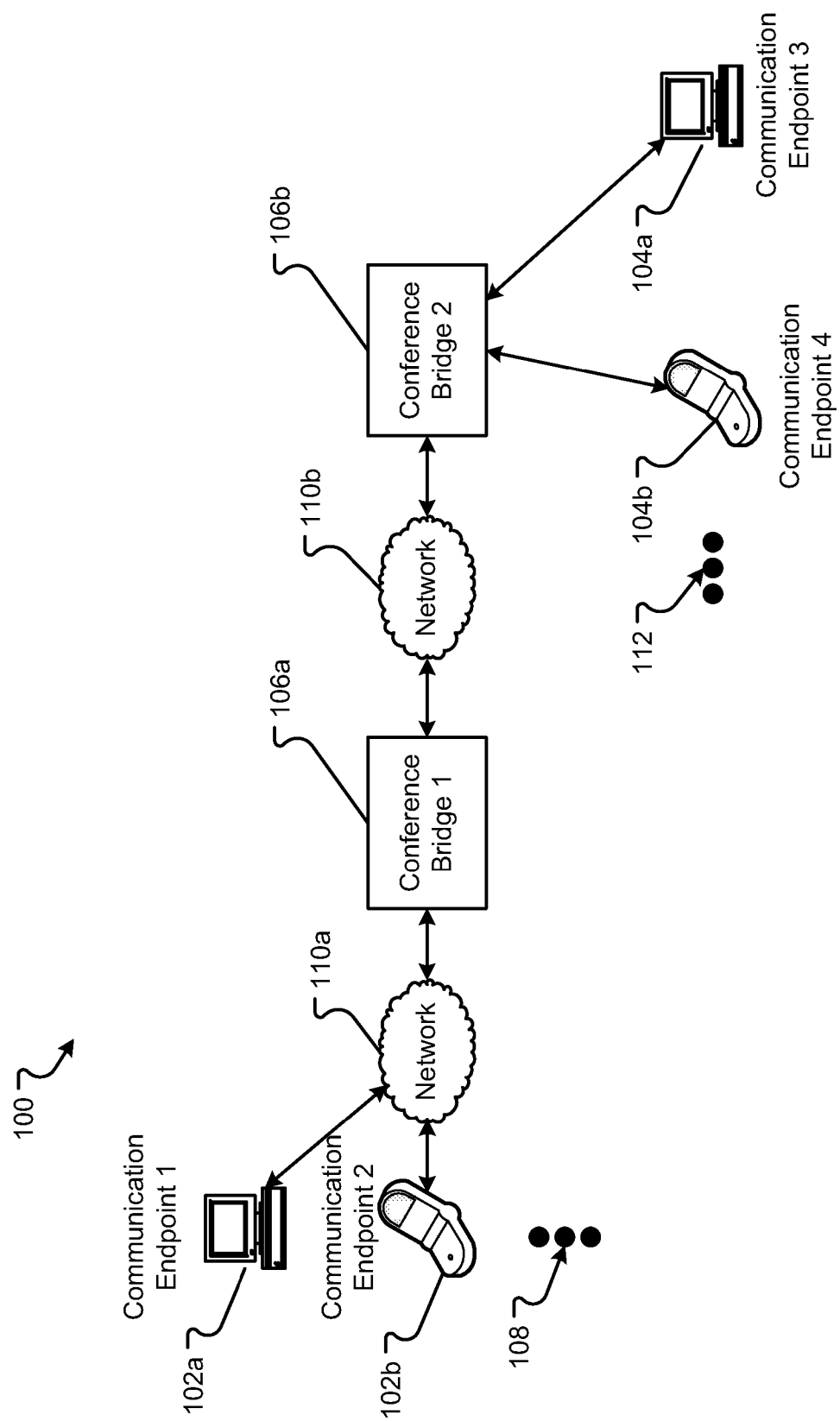
FIG. 1 is a block diagram of an embodiment of a system for conducting a global conference.

An embodiment of a system 100 for conducting a global conference is shown in FIG. 1. The system 100 can include two or more conference bridges, such as, conference bridge 1 106a and conference bridge 2 106b. The conference bridges 106 can be in communication with one or more communication endpoints 102a, 102b, 104a, and/or 104b. For example, conference bridge 1 106a can be in communication with communication endpoint 1 102A and/or communication endpoint 2 102B. There may be more or fewer communication endpoints 102 in communication with conference bridge 1 106a than those shown in FIG. 1, as represented by ellipses 108. Likewise, conference bridge 2 106b can be in communication with communication endpoint 3 104a and communication endpoint 4 104b. Conference bridge 2 106b can be in communication with more or fewer communication endpoints than those shown in FIG. 1, as represented by ellipses 112.

The communication endpoints 102 or 104 can communicate with the conference bridges 106 through one or more networks 110. The networks 110 can represent local area networks (LAN), wide area networks (WAN), public switched telephone network, the Internet, other types of data or telephoning networks, or other networks capable of communicating data bi-directionally between the communication endpoints 102 and the conference bridges 106. Further, the communication bridges 106 can communicate with each other through a network 110b.

Figure 2:
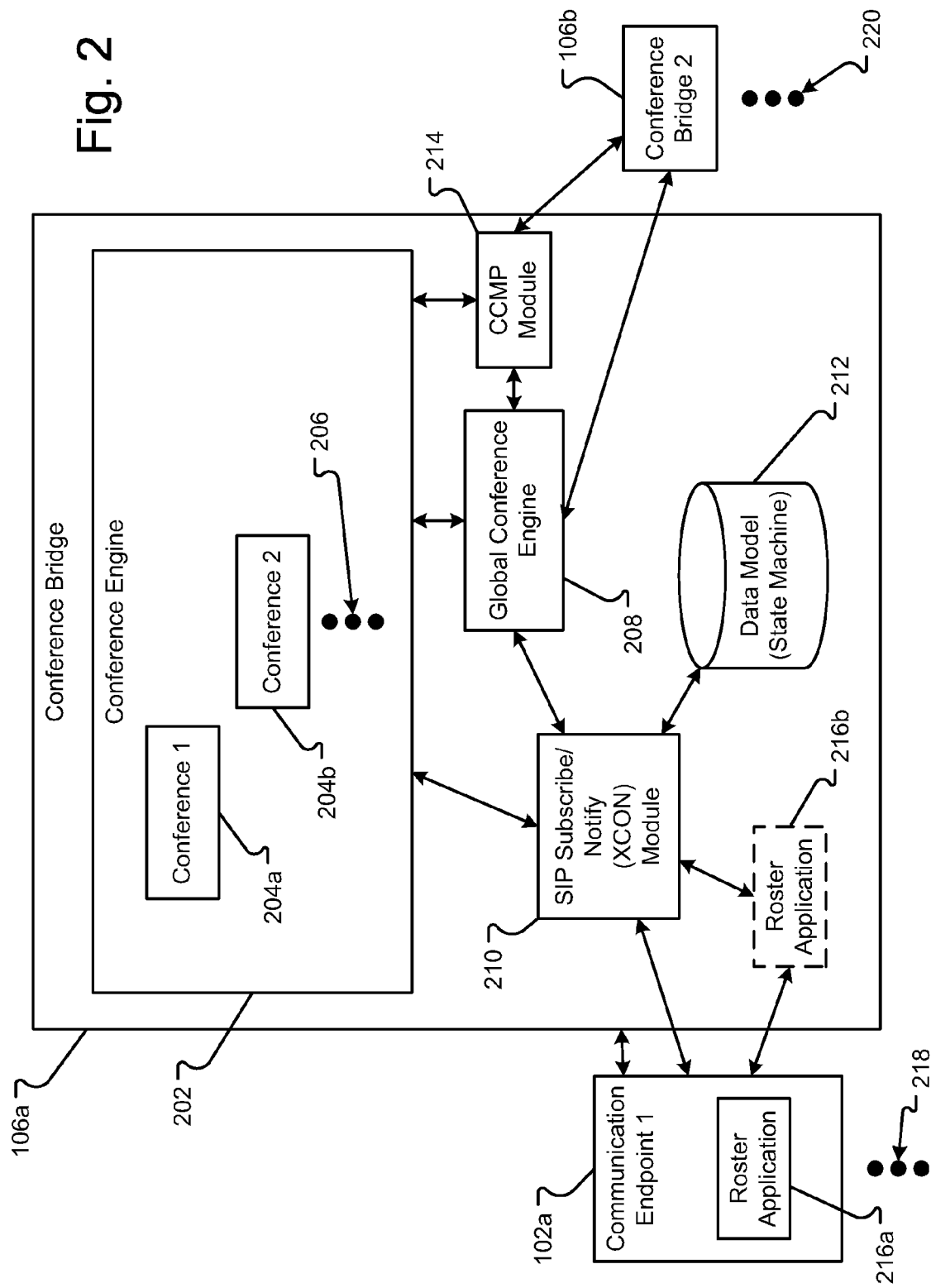
FIG. 2 is a block diagram of an embodiment of a conference bridge operable to conduct a global conference.

An embodiment of a conference bridge 106 is shown in FIG. 2. The conference bridge 106a can execute one or more modules, which may be hardware and/or software, to conduct a global conference. The conference bridge 106 can execute a conference engine 202, which may conduct one or more conferences 204a or 204b. For example, conference engine 202 conducts conference 1 204a and conference 2 204b. The conference engine 202 can conduct more or fewer conferences than those shown in FIG. 2, as represented by ellipses 206. The conference engine 202 is operable to initialize conferences such that as communication endpoints 102 can call into a conference 204. The conference engine 202 can also link two or more communication endpoints 102 in a conference 204 to transfer data between the two communication endpoints 102 during the conference 204. Thus, the conference engine 202 can receive and broadcast data with and amongst the communication endpoints 102. The conference can include one or more communication endpoints 102, as represented by ellipses 218.

To establish a global conference, the conference engine 202 communicates with the global conference engine 208. The global conference engine 208 is operable to initialize and conduct the global conference with a second conference bridge 106b. Thus, the global conference engine 208 is operable to create a link line through a network 110 to exchange data (e.g., audio data, video data, or other multimedia data) with other conference bridges, e.g., conference bridge 2 106b. Data received from the second conference bridge 106b by the conference engine 208 is sent to the conference engine 202 to then be distributed as part of the conference 204. Thus, audio data, video data, or other data received from the conference bridge 106b can be communicated through the conference engine 202 to the communication endpoints 102 that are part of the conference 204. The global conference engine 208 can also act as another entity within the conference 204. Thus, a data model representing the conference and the participants within the conference can be created with the global conference engine 208 as part of the conference 204. A global conference can include one or more other conference bridges 106b, as represented by the ellipses 220.

The conference bridge 106a can also include a SIP subscribe/notify module 210. The SIP subscribe/notify module 210 is operable to obtain and/or distribute state information from one or more participants within a conference 204 executed by the conference engine 202. The SIP subscribe/notify module 210 can store the state information and/or the data model 212, which may contain a state machine. The data model 212 includes all state information and can provide information back to the SIP subscribe/notify module 210. As changes occur to the state of either the conference 204 or one or more of the participants within the conference 204, the SIP subscribe/notify module 210 can send SIP notifications to the participants informing the participants of the changes. In embodiments, the subscription and notification messages are sent using the XCON protocol that is included in the SIP standard. The use of the XCON protocol ensures efficiency and extensibility of the system that is an advantage over using a specialized and custom-built application programming interface.

A roster application 216 is operable to receive the state information from the SIP subscribe/notify module 210 and display or provide that state information to a user. In embodiments the roster application 216a is executed by a smart communication endpoint 102a. The roster application 216a can receive the SIP notification messages from the SIP subscribe/notify module 210 and display those notification messages on a display device for a user. Thus, a screen or display on a smart phone can show the participants or state of a conference being executed or conducted with the communication endpoint 102a.

In other embodiments, the roster application 216b is executed by the conference bridge 106a. Thus, the roster application 216b receives the SIP notification messages and provides those notification displays to the communication endpoint 102a without the communication endpoint 102a executing an application. In this scenario, a communication endpoint 102a, without the capability of executing applications, can still view or perceive the information about the conference 204.

During a global conference, commands may be executed or operations conducted by one or more of the conference bridges 106. For example, a moderator of the conference 204 may place the conference 204 into a lecture mode, which mutes all communication endpoints 102 but one. As such, only one communication endpoint 102 sends out data for receipt by all other communication endpoints 102. To send commands between conference bridges 106 participating in the global conference, a CCMP module 214 receives the command from the conference engine 202 and forwards the command(s) using the CCMP protocol to the second conference bridge 106b. The command(s) may then be synchronously executed by both the conference bridge 1 106a and the conference bridge 2 106b. Synchronous execution can mean executing the commands substantially at the same time or within temporal proximity, such that the states of the conference 204 being executed at the conference bridge 106a and conference bridge 106b remain substantially similar throughout the conference 204. The use of the CCMP protocol ensures efficiency and extensibility of the system that is an advantage over using a specialized and custom-built application programming interface.

Figure 3:
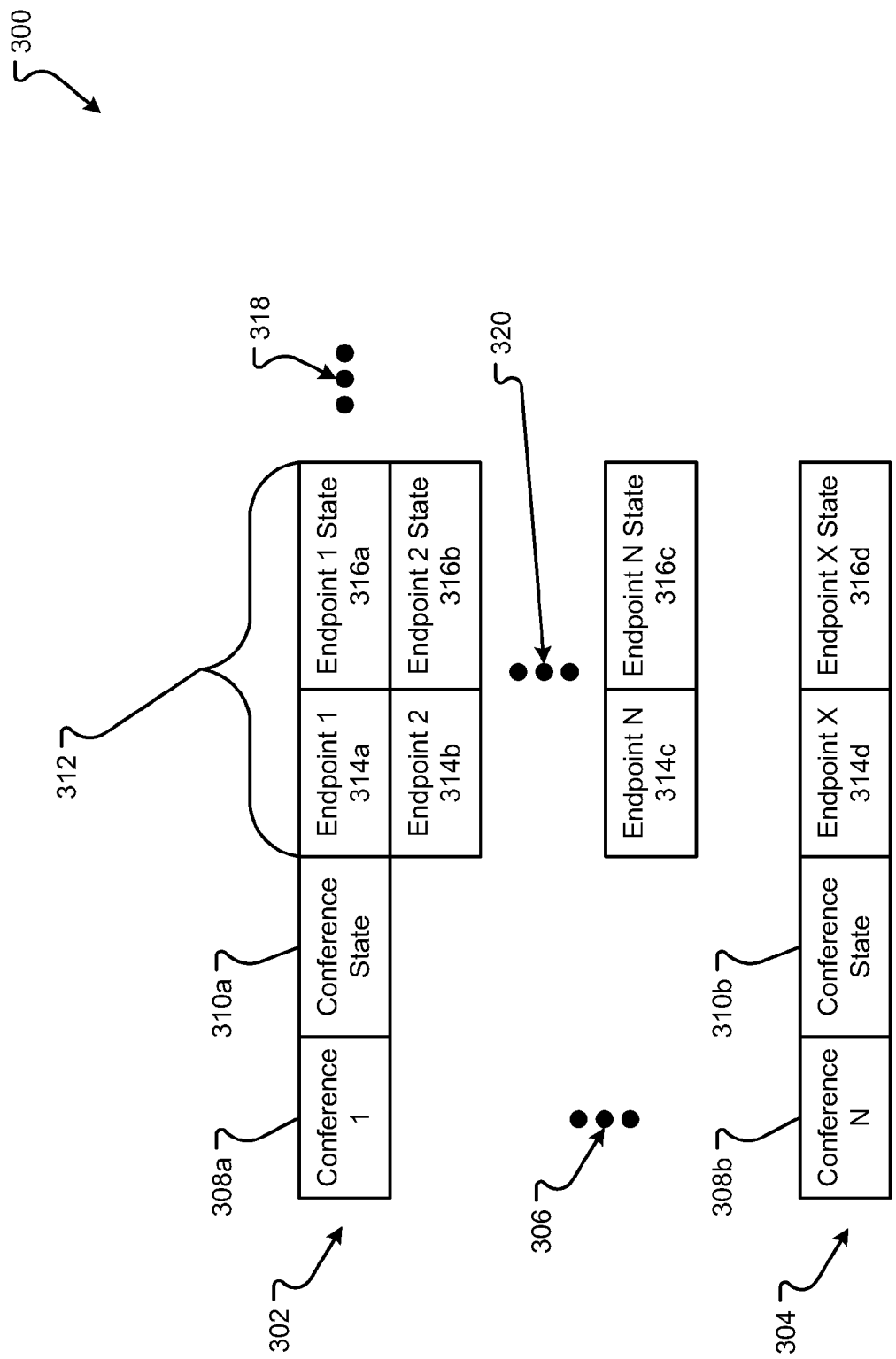
FIG. 3 is an embodiment of a data model operable to store state information for one or more conferences.

A data model 300 for storing state information for conferences is shown in FIG. 3. The data model 300 can have one or more data structures 302 and/or 304, where each data structure 302 and/or 304 is associated with a separate conference being conducted by the conference engine 202. For example, conference 204a may have a conference data structure 302, which stores the state information for the conference 204a. Similarly, conference 2 204B may have a second conference data structure 304, which stores the state information for that conference 204b. The conference data structure 302 or 304 can include state information for the conference, the one or more endpoints 102 that are involved in the conference 204 regardless of whether the state information is for the local conference or the conference being conducted at a distant conference bridge 106b.

The conference state information can include at least a conference identifier (ID) 308 and a conference state 310. The conference identifier 308 can be any identifier which uniquely identifies the conference 204 for the conference engine 202. For example, the conference identifier can be a globally unique identifier (GUID), a conference name, a unique phone number, or some other ID created to identify the conference 204. The conference state 310 can be any information that is generally applicable to the conference 204. For example, the conference state can be the mode in which the conference 204 is in, the settings for the conference 204, the number of participants in the conference 204, the phone number for the conference 204, the time the conference 204 has been conducted, or other information related to the conference 204. In embodiments, each conference bridge 106 can use the same conference ID for the conference 204 that is being conducted at the conference bridge(s) 206. Thus, the conference IDs 308 can be used to identify information exchanged between the conference bridges 206. In some embodiments, the conference state 310 for the conferences executed at the different conference bridges 206 can be different or can be a conglomeration of the conference states for all conferences 204 being conducted at every conference bridge 206.

An endpoint data structure 312 can include information about the state of the endpoints 102 that are involved in the conference 204. The endpoint data structure 312 can include an endpoint identifier 314 and an endpoint state 316. The endpoint ID 314 can be any unique ID which identifies the communication endpoint 102 in relation to all other endpoints that may be participating in the conference 204. For example, the endpoint ID 314 can be the phone number of the communication endpoint 102 or some other ID, such as a GUID. The endpoint state information 316 can include characteristics or information about the communication endpoint 102. For example, the endpoint state information 316 can include the capabilities of the communication endpoint 102, the operations or functions executed by the communication endpoint 102, whether the communication endpoint 102 is muted, whether the communication endpoint 102 is currently receiving a signal from the user speaking into a microphone, or other such information which would describe the state of the communication endpoint 102. The conference data structure 302 can include more or fewer items of information, as represented by the ellipses 318. The conference data structure 302 shows three endpoint data structures 312, the conference data structure 302 can include more or fewer endpoint data structures 312, as represented by the ellipses 320.

Figure 4:
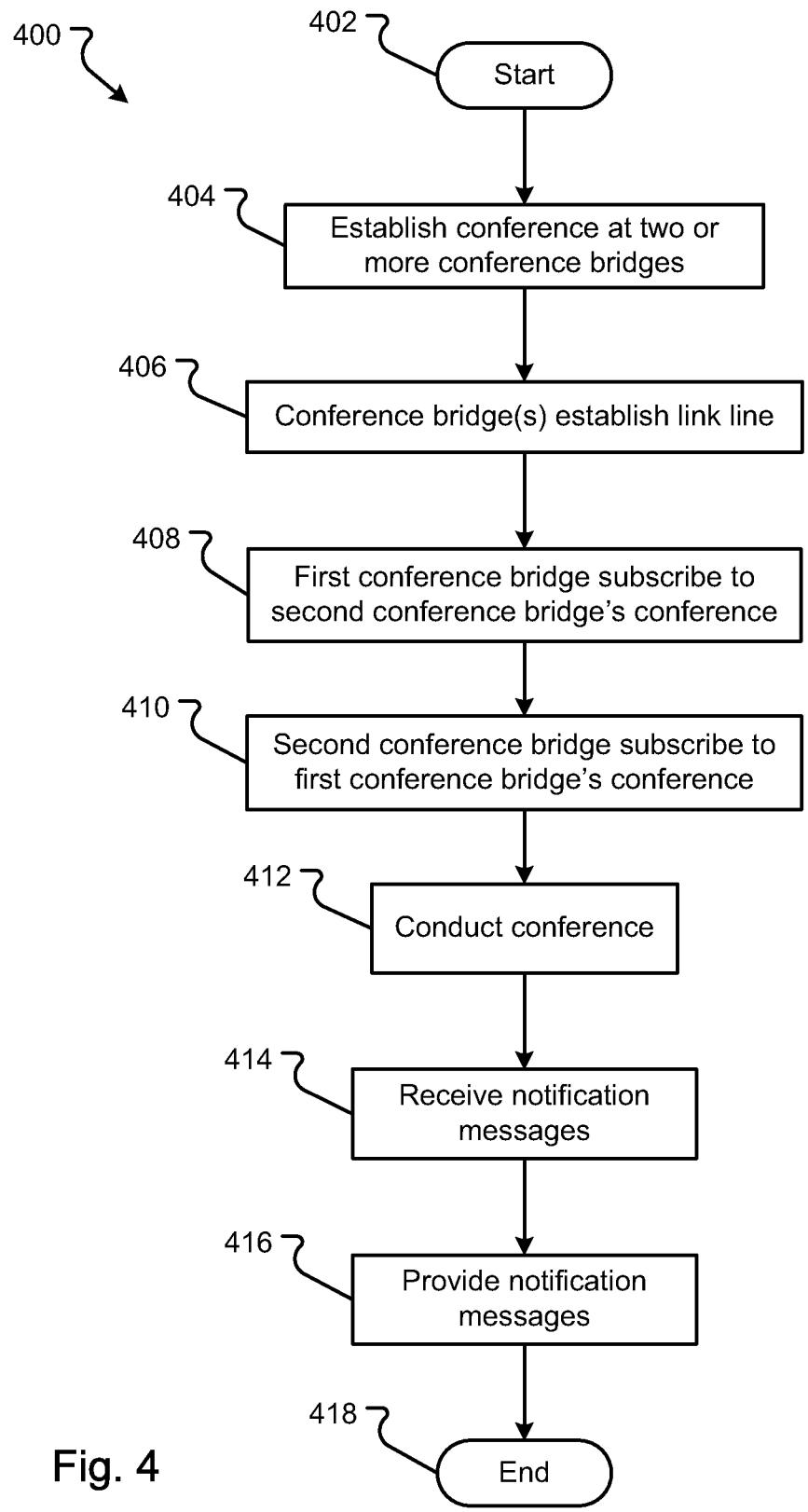
FIG. 4 is a flow diagram of an embodiment of a process for updating roster or other information for a global conference.

An embodiment of a method 400 for automatically conducting a global conference is shown in FIG. 4. Generally, the method 400 begins with a start operation 402 and terminates with an end operation 418. While a general order for the steps of the method 400 are shown in FIG. 4, the method 400 can include more or fewer steps or arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, data structures, user interfaces, etc. described in conjunction with FIGS. 1-3.

Two or more conference bridges 106 establish a conference, in step 404. A first conference bridge 106a can establish a first conference 204 at the first conference bridge 106a by receiving a request for the conference 204 from at least one communication endpoint 102a communicating with the first conference bridge 106a. The first conference bridge 106a may then execute the conference engine 202 and begin a conference 204. The conference engine 202 may then register a conference 204 with the SIP subscribe/notify module 210. The SIP subscribe/notify module 210 can then create the data model 300 in the data model database 212 for the conference 204. This data model 300 may include a conference data structure 302, as described in conjunction with FIG. 3.

A second conference bridge 106b can also establish the first conference, in a similar manner, at the second conference bridge 106b. To link the conference bridges 106 in the global conference, the first conference bridge 106a and/or the second conference bridge 106b establishes a link line between the conference bridges 106, in step 406. The link line is a bi-directional communication connection through a network 110b that establishes the ability for the conference bridges 106 to exchange data, such as audio data, during the conference 204.

Further, the first conference bridge 106a sends a first SIP subscribe request for the first conference being executed at the second conference bridge 106b, in step 408. The SIP subscribe request message is sent from the global conference engine 208 of the first conference bridge 106a to the SIP subscribe/notify module 210 at the second conference bridge 106b. The first conference bridge 106a requests information about the first conference being conducted at the second conference bridge 106b. Likewise, the second conference bridge 106b sends a second SIP subscribe request message for the first conference 204 being conducted at the first conference bridge 106a, in step 410. This second SIP subscribe request message is received at the SIP subscribe/notify module 210 of the first conference bridge 106a. In this manner, the first and second conference bridges 106 can thereinafter receive notifications about state changes at the opposite conference bridges 106.

The first and second conference bridges 106 then conduct the first conference 204, in step 412. Conducting a conference is known in the art and includes exchanging audio data or other data among the communication endpoints 102/104. As state changes occur within one of the conference bridges 106, the conference engine 202 sends updates of the state to the SIP subscribe/notify module 210, in step 414. The SIP subscribe/notify module 210 can update the data model 212 with the new state information. Further, the SIP subscribe/notify module 210 can send SIP notification messages using the XCON protocol to either the communication endpoints 102 or to the distant conference bridges 106b, in step 416. The SIP notification messages can update roster applications 216 at the communication endpoint 102a, at the local conference bridge 106a, and communication endpoints 104 at the distant conference bridge 106b. Thus, communication endpoints 102 at the first conference bridge 106a can receive SIP notification messages from communication endpoints 104 communicating with the second conference bridge 106b. The notifications also work in reverse as notification messages are sent to communication endpoints 104 at the second conference bridge 106b. The roster applications 216, either executed at the conference bridge 106 or at the communication endpoint 102, can display the information, included in the SIP notification messages, to the user. The SIP notification messages can include the state of the conference, for example, if a conference state has changed or if a state of the communication endpoint has changed.

Figure 5:
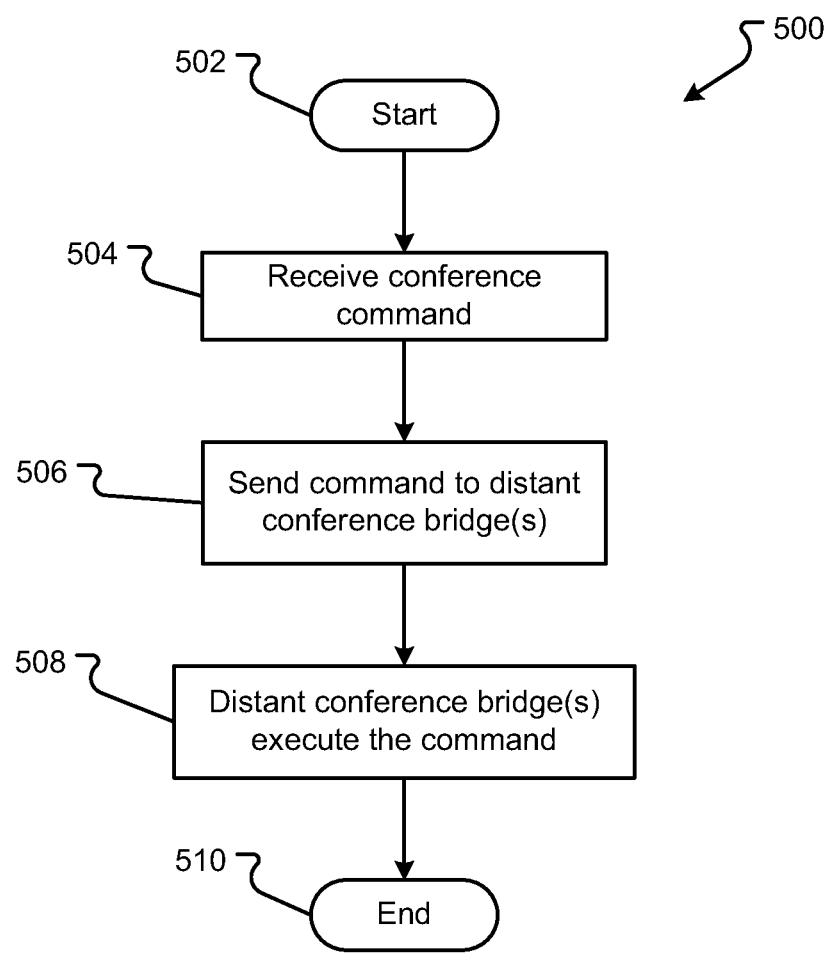
FIG. 5 is a flow diagram of an embodiment of a process for exchanging commands in a global conference.

An embodiment of a method 500 for exchanging commands during a global conference is shown in FIG. 5. Generally, the method 500 begins with a start operation 502 and terminates with an end operation 516. While a general order for the steps of the method 500 are shown in FIG. 5, the method 500 can include more or fewer steps or the order of the steps may be arranged differently than the method 500 shown in FIG. 5. The method 500 can be a set of computer-executable instructions executed by a computer system or processor and/or encoded or stored on a computer readable medium. Hereinafter, the method 500 shall be explained with reference to the systems, components, modules, data structures, user interfaces, etc. described in conjunction with FIGS. 1-3.

A conference engine 202 receives a conference command, in step 504. The conference command can be sent from a communication endpoint 102 to a conference 204. The conference engine 202 can then send the conference command to the CCMP module 214. In embodiments, the conference engine 202 may wait to execute the command or execute the command immediately.

The CCMP module 214 can then send the conference command to the distal conference bridge 106b, in step 506. The conference command may be sent as part of the CCMP protocol using HTTP or some other transport protocol. The second conference bridge 106b can receive the conference command. The second conference bridge 106b, upon receiving the conference command, can then send the conference command to the conference engine 202 at the second conference bridge 106b.

At some point thereinafter both the distant conference bridge 106b and the local conference bridge 106a can execute the conference command, in step 508. In embodiments, the command can be executed substantially simultaneously between the two conference bridges 106. The near simultaneous execution of the commands can occur by putting a trigger date and time stamp on the conference command to trigger execution of the conference command at a certain time. Thus, the distant conference bridge 106b and local conference bridge 106a can synchronously execute the conference command and remain in "synchronicity" during the conference 204.

Figure 6:
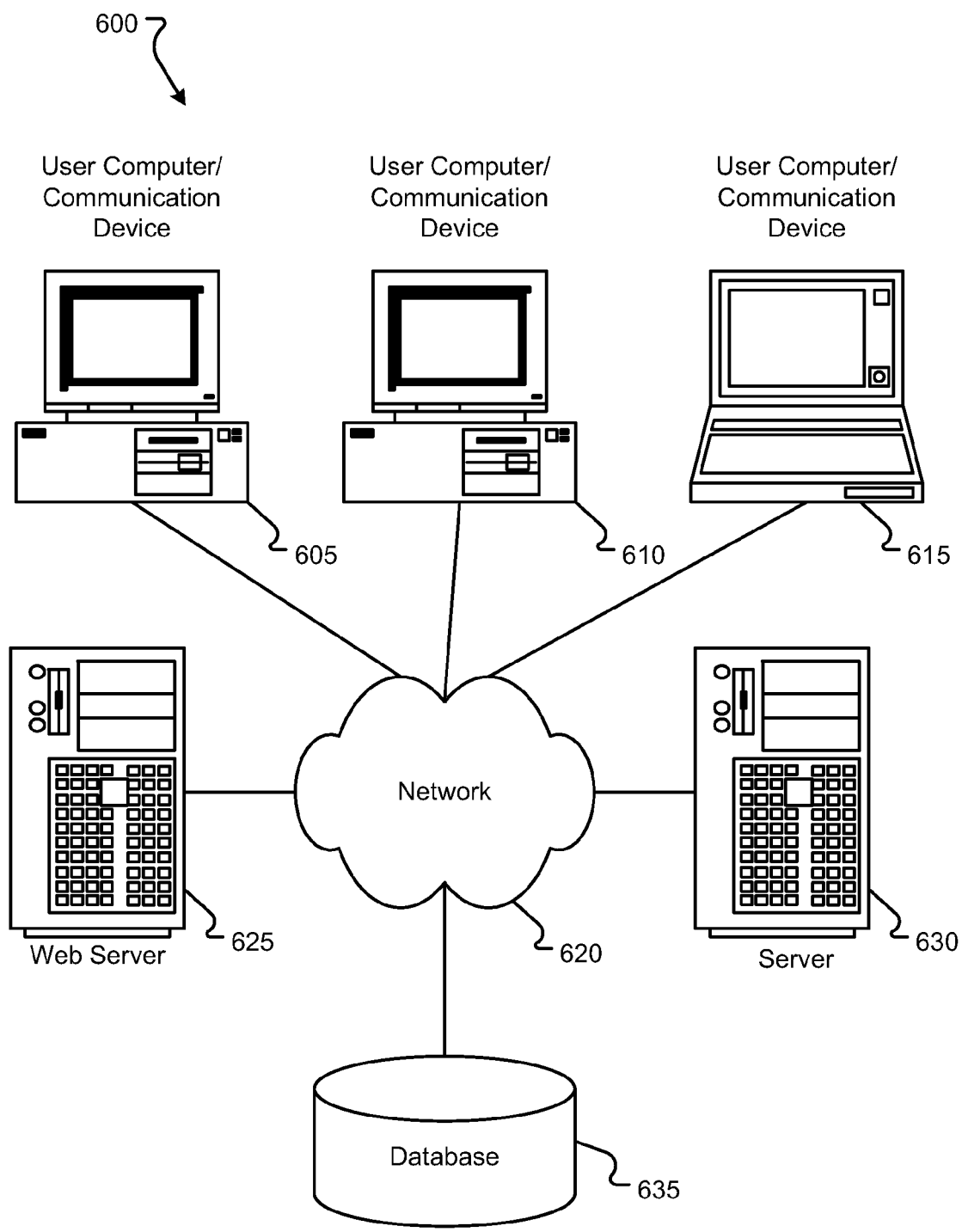
FIG. 6 is a block diagram of an embodiment of a computing environment operable to execute the embodiments described herein.

FIG. 6 illustrates a block diagram of a computing environment 600 that may function as system or environment for the embodiments described herein. The system 600 includes one or more user computers 605, 610, and 615. The user computers 605, 610, and 615 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 605, 610, 615 may also have any of a variety of applications, including for example, database client and/or server applications, and web browser applications. Alternatively, the user computers 605, 610, and 615 may be any other electronic device, such as a thin-client computer, Internet-enabled mobile telephone, and/or personal digital assistant, capable of communicating via a network (e.g., the network 620 described below) and/or displaying and navigating web pages or other types of electronic documents. Although the exemplary system 600 is shown with three user computers, any number of user computers may be supported.

System 600 further includes a network 620. The network 620 can be any type of network familiar to those skilled in the art that can support data communications using any of a variety of commercially-available protocols, including, without limitation, TCP/IP, SNA, IPX, AppleTalk, and the like. Merely by way of example, the network 620 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system 600 may also include one or more server computers 625, 630. One server may be a web server 625, which may be used to process requests for web pages or other electronic documents from user computers 605, 610, and 615.

The web server can be running an operating system including any of those discussed above, as well as any commercially-available server operating systems. The web server 625 can also run a variety of server applications, including HTTP servers, FTP servers, CGI servers, database servers, Java servers, and the like. In some instances, the web server 625 may publish operations available operations as one or more web services.

The system 600 may also include one or more file and or/application servers 630, which can, in addition to an operating system, include one or more applications accessible by a client running on one or more of the user computers 605, 610, 615. The server(s) 630 may be one or more general purpose computers capable of executing programs or scripts in response to the user computers 605, 610 and 615. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 630 may also include database servers, including without limitation those commercially available from Oracle, Microsoft, Sybase™, IBM™ and the like, which can process requests from database clients running on a user computer 605.

The web pages created by the web application server 630 may be forwarded to a user computer 605 via a web server 625. Similarly, the web server 625 may be able to receive web page requests, web services invocations, and/or input data from a user computer 605 and can forward the web page requests and/or input data to the web application server 630. In further embodiments, the server 630 may function as a file server. Although for ease of description, FIG. 5 illustrates a separate web server 625 and file/application server 630, those skilled in the art will recognize that the functions described with respect to servers 625, 630 may be performed by a single server and/or a plurality of specialized servers, depending on implementation-specific needs and parameters. The computer systems 605, 610, and 615, file server 625 and/or application server 630 may function as servers or other systems described herein.

The system 600 may also include a database 635. The database 635 may reside in a variety of locations. By way of example, database 635 may reside on a storage medium local to (and/or resident in) one or more of the computers 605, 610, 615, 625, 630. Alternatively, it may be remote from any or all of the computers 605, 610, 615, 625, 630, and in communication (e.g., via the network 620) with one or more of these. In a particular set of embodiments, the database 635 may reside in a storage-area network ("SAN") familiar to those skilled in the art. Similarly, any necessary files for performing the functions attributed to the computers 605, 610, 615, 625, 630 may be stored locally on the respective computer and/or remotely, as appropriate. In one set of embodiments, the database 635 may be a relational database, such as Oracle 10i™, that is adapted to store, update, and retrieve data in response to SQL-formatted commands. Database 635 may be the same or similar to the database used herein.

Figure 7:
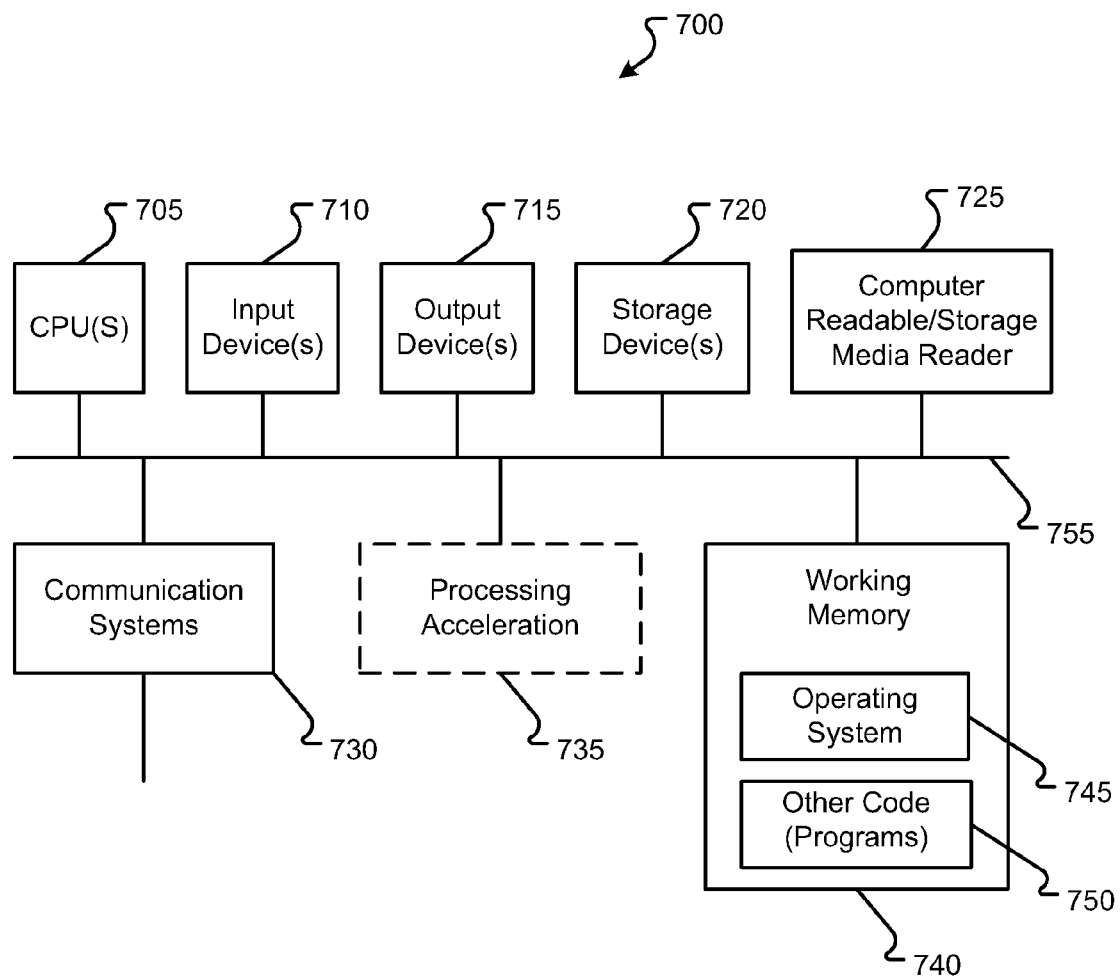
FIG. 7 is a block diagram of an embodiment of a computer or computing system environment operable to execute as the one or more devices described herein.

FIG. 7 illustrates one embodiment of a computer system 700 upon which servers or other systems described herein may be deployed or executed. The computer system 700 is shown comprising hardware elements that may be electrically coupled via a bus 755. The hardware elements may include one or more central processing units (CPUs) 705; one or more input devices 710 (e.g., a mouse, a keyboard, etc.); and one or more output devices 715 (e.g., a display device, a printer, etc.). The computer system 700 may also include one or more storage device 720. By way of example, storage device(s) 720 may be disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 725; a communications system 730 (e.g., a modem, a network card (wireless or wired), an infra-red communication device, etc.); and working memory 740, which may include RAM and ROM devices as described above. In some embodiments, the computer system 700 may also include a processing acceleration unit 735, which can include a DSP, a special-purpose processor and/or the like.

The computer-readable storage media reader 725 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 730 may permit data to be exchanged with the network 720 and/or any other computer described above with respect to the system 700. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 740, including an operating system 745 and/or other code 750, such as program code implementing the servers or devices described herein. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail.

In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the embodiments have been described in detail herein, it is to be understood that the inventive concepts may be otherwise variously embodied and employed, and that the appended claims are intended to be construed to include such variations, except as limited by the prior art.

What is claimed is:

1. A method for conducting a global conference, comprising:
    a first conference bridge establishing a first conference at the first conference bridge, wherein the first conference at the first conference bridge includes a first communication endpoint;
    a second conference bridge establishing the first conference at the second conference bridge, wherein the first conference at the second conference bridge includes a second communication endpoint;
    the first conference bridge establishing a link line between the first conference bridge and the second conference bridge;
    the first conference bridge sending a first Session Initiation Protocol (SIP) subscribe request for the first conference at the second conference bridge;
    the second conference bridge sending a second SIP subscribe request for the first conference at the first conference bridge;
    the first and the second conference bridges conducting the first conference;
    the first conference bridge receiving a first SIP notification associated with the first conference at the second conference bridge based on the first SIP subscribe request, wherein the first SIP notification is sent based on a change of a state of the first conference at the second conference bridge or a change of state of the second communication endpoint, wherein the first SIP notification includes conference roster information of the second conference bridge;
    executing a roster application;
    getting conference roster information of the first conference bridge and the second conference bridge; and
    the first conference bridge providing the conference roster information of the first and second conference bridges to the first communication endpoint.

2. The method as defined in claim 1, further comprising:
    the second conference bridge receiving a second SIP notification associated with the first conference at the first conference bridge; and
    the second conference bridge providing the second SIP notification to the second communication endpoint.

3. The method as defined in claim 1, wherein the link line bi-directionally transmits audio data for the conference.

4. The method as defined in claim 1, wherein the information associated with the first SIP notification includes at least one of a state of the conference at the first conference bridge, a state of the conference at the second conference bridge, or a state of the second communication endpoint.

5. The method as defined in claim 4, wherein the roster application displays each of the state of the conference at the first conference bridge, the state of the conference at the second conference bridge, and the state of the second communication endpoint.

6. The method as defined in claim 5, wherein the first communication endpoint executes the roster application.

7. The method as defined in claim 1, wherein the first communication endpoint is designated a moderator for the conference, the method further comprising:
    receiving a conference command from the first communication endpoint;
    the first conference bridge sending the conference command to the second conference bridge; and
    both the first conference bridge and the second conference bridge executing the conference command.

8. The method as defined in claim 7, wherein the first conference bridge sends the conference command to the second conference bridge using Conference Control and Manipulation Protocol (CCMP).

9. The method as defined in claim 8, wherein the second conference bridge sends the conference command to the second communication endpoint to execute.

10. A communication network comprising:
    two or more communication endpoints, wherein at least one of the two or more communication endpoints comprises a roster application that provides conference roster information of a first and second conference bridges;
    two or more conference bridges, each of the two or more conference bridges being in communication with at one of the two or more communication endpoints, each of the two or more conference bridges being in communication with one another conference bridge, each of the two or more conference bridges comprising:
        a conference engine operable to conduct a first conference;
        a global conference engine operable to:
            subscribe to the first conference conducted at the other conference bridge;
            in response to the subscription to the first conference conducted at the other conference bridge and in response to a change of state associated with at least one of the first conference conducted at the other conference bridge or a communication endpoint in communication with the other conference bridge, receive a first notification associated with the change of state associated with the at least one of the first conference conducted at the other conference bridge or the communication endpoint in communication with the other conference bridge, wherein the first notification includes the conference roster information of the other conference bridge;

provide the conference roster information associated with the first notification and the conference roster information of the other conference bridge;

a subscribe or notify module operable to:
receive a subscription request from the other conference bridge;
send the first notification to the other conference bridge, wherein the first notification includes first information;
get the conference roster information of the other conference bridge; and
store state information in a data model, wherein changes to the state information in the data model are the first information sent in the first notification.

11. The communication network as defined in claim 10, the two or more conference bridges are in communication over a link line.

12. The communication network as defined in claim 10, wherein the roster application is operable to display the state information in the data model.

13. The communication network as defined in claim 10, wherein the data model comprises:
a conference data structure associated with the first conference, the conference data structure comprising:
a conference identifier;
a conference state;
an endpoint data structure, the endpoint data structure comprising:
an endpoint identifier; and
an endpoint state.

14. The communication network as defined in claim 10, wherein the data model stored at a first conference bridge includes the state of the first conference conducted at the second conference bridge.

15. The communication network as defined in claim 10, wherein a conference bridge further comprising a Conference Control and Manipulation Protocol (CCMP) module operable to:
receive a command for the first conference; and
send the command to the second conference bridge to synchronously execute the conference command with a first conference bridge.

16. The communication network as defined in claim 10, wherein the subscribe or notify module sends the first notification to the second conference bridge using the Centralized Conferencing (XCON) protocol.

17. A computer program product including computer executable instructions stored onto a tangible, non-transitory computer readable medium, which, when executed by a processor, causes the processor to perform a method for conducting a global conference, the instructions comprising:
instructions to establish a first conference at a first conference bridge, wherein the first conference at the first conference bridge includes a first communication endpoint;
instructions to establish a link line between the first conference bridge and a second conference bridge, wherein the link line is a Session Initiation Protocol (SIP) dialout;
instructions to send a first SIP subscribe request for the first conference from the second conference bridge, wherein the first subscribe request is sent using Centralized Conferencing (XCON);
instructions to conduct the first conference, wherein a conference roster for the first conference is synchronized between the first conference bridge and the second conference bridge, wherein synchronizing the conference roster between the first and second conference bridges comprises: instructions to receive a notification from the second conference bridge comprising a conference roster of the second conference bridge and instructions to get a conference roster of the first conference bridge;
instructions to receive a first command associated with the first conference at the first conference bridge based on the first SIP subscribe request and based on a change of a state of the first conference;
instructions to provide the first command to the second conference bridge, wherein the first command is sent using Conference Control and Manipulation Protocol (CCMP); and
instructions to at least substantially synchronously execute the first command with the second conference bridge.

18. The computer program product as defined in claim 17, further comprising:
instructions to receive a first change to a state of the first communication endpoint;
instructions to update a data model associated with the first conference with the first change; and
instructions to notify the second conference bridge of the first change to the state of the first communication endpoint.

19. The computer program product as defined in claim 18, further comprising:
instructions to receive a second change to a state of a second communication endpoint that is in communication with the second conference bridge;
instructions to update the data model associated with the first conference with the second change to the state of the second communication endpoint that is in communication with the second conference bridge; and
instructions to notify the first communication endpoint of the second change to the state of the second communication endpoint.

* * * * *